(12) United States Patent
Messina

(10) Patent No.: US 11,192,659 B2
(45) Date of Patent: Dec. 7, 2021

(54) DEVICE PROVIDING PIVOTING CONNECTION BETWEEN AT LEAST TWO COMPONENTS, AIRCRAFT COMPRISING A COWL EQUIPPED WITH THIS PIVOTING-CONNECTION DEVICE

(71) Applicant: Airbus Operations SAS, Toulouse (FR)

(72) Inventor: Paolo Messina, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 350 days.

(21) Appl. No.: 16/367,585

(22) Filed: Mar. 28, 2019

(65) Prior Publication Data

US 2019/0308739 A1 Oct. 10, 2019

(30) Foreign Application Priority Data

Apr. 10, 2018 (FR) ........................... 1853088

(51) Int. Cl.
| | | |
|---|---|---|
| *B64D 29/06* | (2006.01) | |
| *F16C 11/10* | (2006.01) | |
| *F16C 11/04* | (2006.01) | |
| *E05D 5/12* | (2006.01) | |
| *B64D 29/08* | (2006.01) | |

(52) U.S. Cl.
CPC ............ *B64D 29/06* (2013.01); *B64D 29/08* (2013.01); *E05D 5/12* (2013.01); *F16C 11/04* (2013.01); *F16C 11/10* (2013.01); *F16C 2326/43* (2013.01)

(58) Field of Classification Search
None
See application file for complete search history.

(56) References Cited

U.S. PATENT DOCUMENTS

| | | |
|---|---|---|
| 3,710,674 A | 1/1973 | Tabor |
| 5,599,056 A | 2/1997 | Schmitt |
| 2007/0289096 A1 | 12/2007 | Zhang |
| 2015/0167726 A1 | 6/2015 | Cassagne et al. |

FOREIGN PATENT DOCUMENTS

| | | |
|---|---|---|
| FR | 2118756 A5 | 7/1972 |
| FR | 2721365 A1 | 12/1995 |
| FR | 3014972 A1 | 6/2015 |

OTHER PUBLICATIONS

French Search Report; priority document.

*Primary Examiner* — Alexander S Thomas
(74) *Attorney, Agent, or Firm* — Greer, Burns & Crain, Ltd.

(57) ABSTRACT

A pivoting-connection device connecting at least two components and comprising a clevis having first and second branches, an arm positioned between the first and second branches of the clevis, a cylindrical pin connecting the clevis and the arm, at least one guide ring which has a flange configured to bear against an interior face of the first branch, an immobilizing system configured to occupy a free state and a blocked state in which the cylindrical pin and the guide ring are immobilized with respect to one another in the longitudinal direction, in both senses of that direction, and a blocking system configured to occupy an unfitted state and a blocked state in which the blocking system is in contact with the exterior face of the first branch.

9 Claims, 2 Drawing Sheets

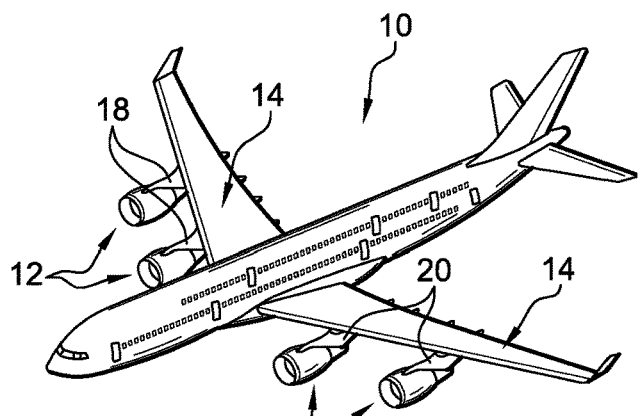
Fig. 1
Prior Art
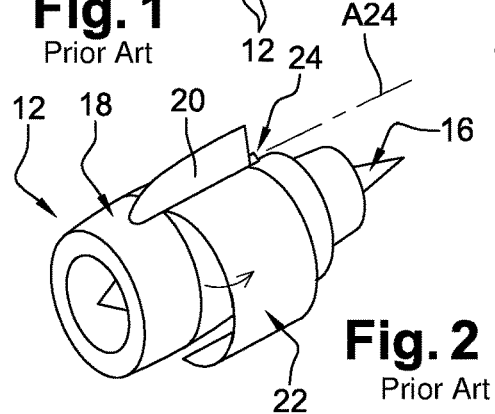
Fig. 2
Prior Art
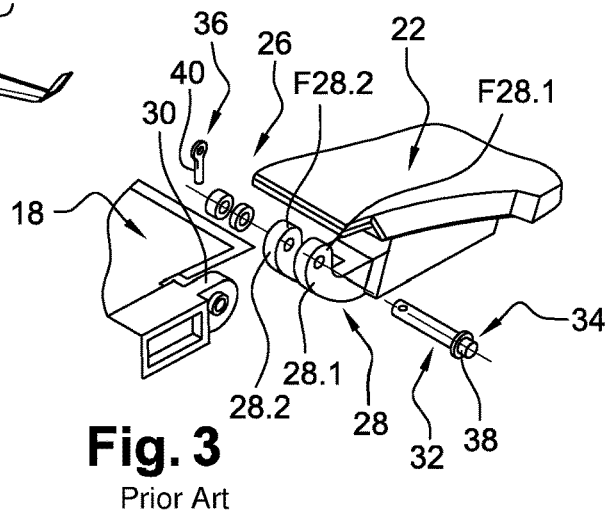
Fig. 3
Prior Art
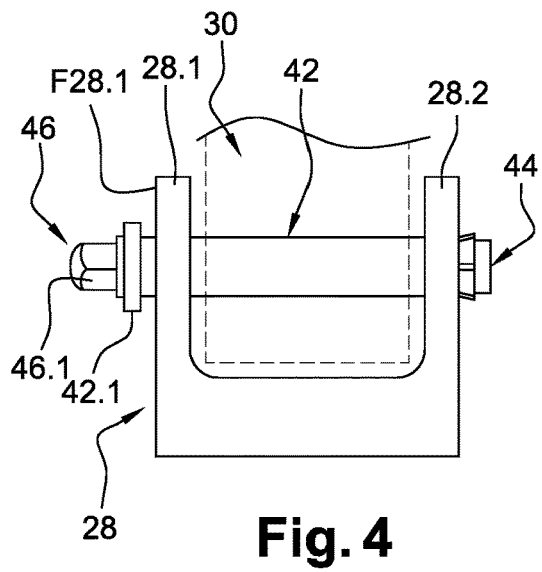
Fig. 4
Prior Art
Fig. 5
Prior Art
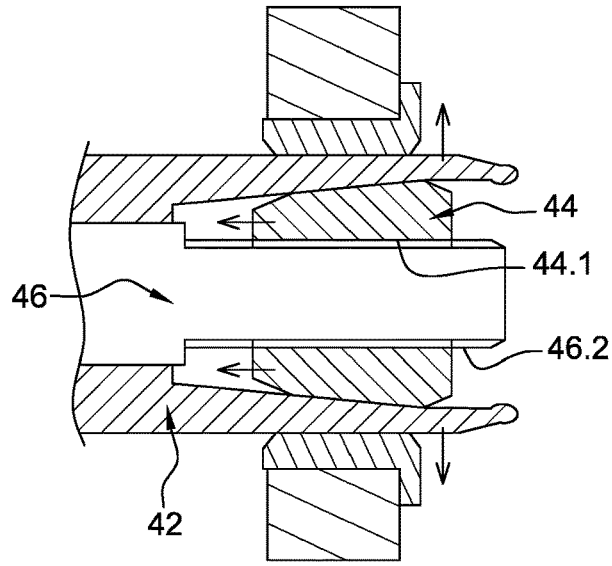
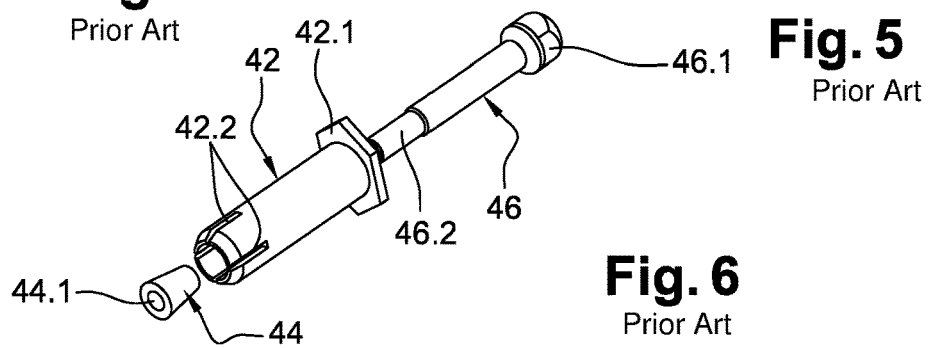
Fig. 6
Prior Art

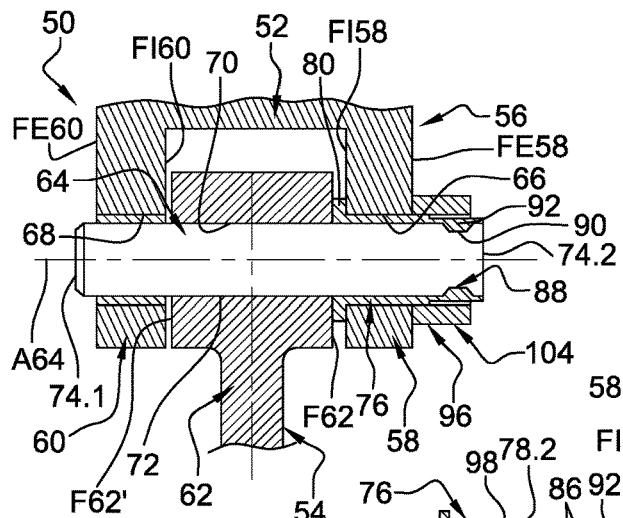
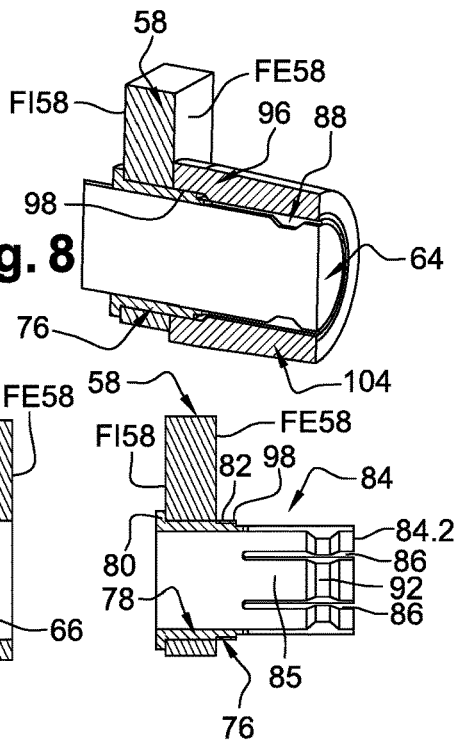
Fig. 7
Fig. 8
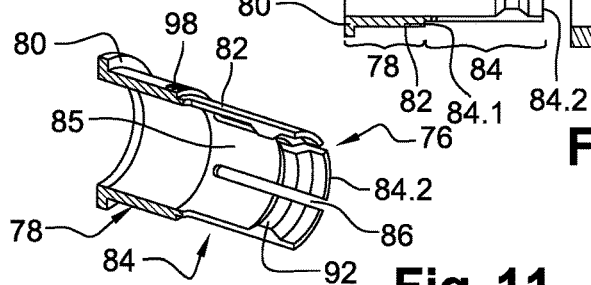
Fig. 9
Fig. 10
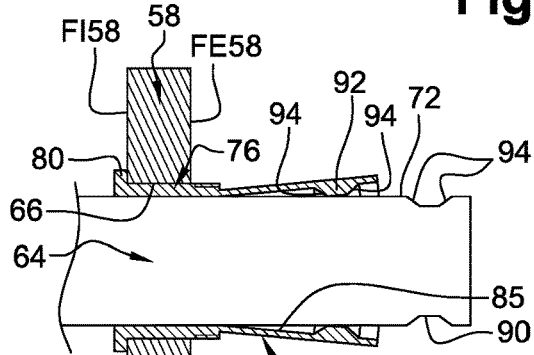
Fig. 11
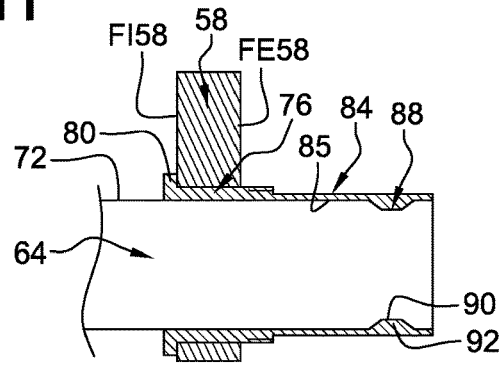
Fig. 12A
Fig. 12B
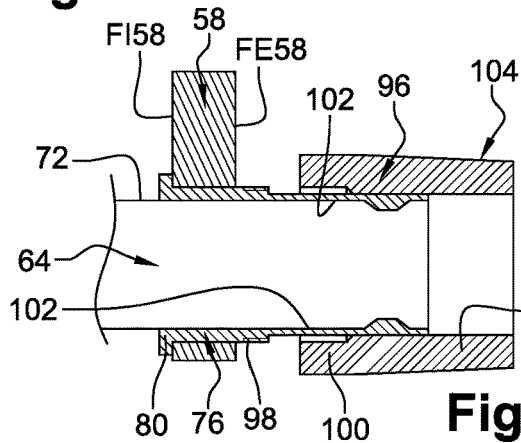
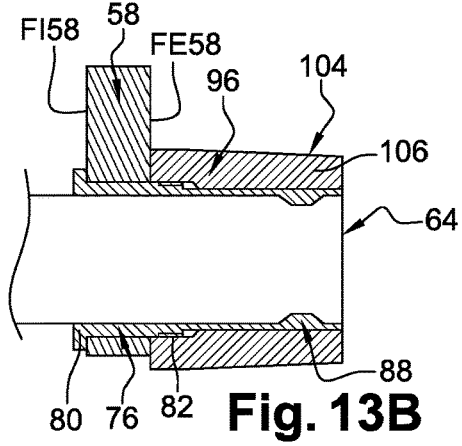
Fig. 13A
Fig. 13B

DEVICE PROVIDING PIVOTING CONNECTION BETWEEN AT LEAST TWO COMPONENTS, AIRCRAFT COMPRISING A COWL EQUIPPED WITH THIS PIVOTING-CONNECTION DEVICE

CROSS-REFERENCES TO RELATED APPLICATIONS

This application claims the benefit of the French patent application No. 1853088 filed on Apr. 10, 2018, the entire disclosures of which are incorporated herein by way of reference.

FIELD OF THE INVENTION

The present application relates to a device providing a pivoting connection between at least two components and to an aircraft comprising a cowl equipped with this pivoting-connection device.

BACKGROUND OF THE INVENTION

According to a configuration visible in FIGS. 1 and 2, an aircraft 10 comprises several engine assemblies 12 which are positioned under the wing structure 14 of the aircraft 10.

An engine assembly 12 comprises an engine 16, a nacelle 18 positioned around the engine 16 and a pylon 20 providing the connection between the engine 16 and the rest of the aircraft 10, notably the wing structure 14.

The nacelle 18 comprises at least one cowl 22 connected to the rest of the nacelle 18 by a hinge 24 allowing the cowl 22 to pivot about a pivot axis A24 between an open position (visible in FIG. 2) and a closed position (visible in FIG. 1).

According to one configuration, the hinge 24 exhibits a plurality of pivoting-connection devices 26 spread along the pivot axis A24.

According to a first embodiment visible in FIG. 3, a pivoting-connection device 26 comprises:

a clevis 28, secured to the cowl 22 (or, respectively, to the rest of the nacelle 18), having two branches 28.1, 28.2, an arm 30, secured to the rest of the nacelle 18 (or, respectively, to the cowl 22), positioned between the branches 28.1, 28.2 of the clevis 28, a cylindrical pin 32 positioned in coaxial bores provided in the two branches 28.1, 28.2 of the clevis 28 and the arm 30, the cylindrical pin 32 providing the connection between the clevis 28 and the arm 30 and having an axis of revolution that coincides with the pivot axis A24.

Guide rings may be interposed between the cylindrical pin 32 and the branches 28.1, 28.2 of the clevis 28 and between the cylindrical pin 32 and the arm 30.

The pivoting-connection device 26 also comprises first and second thrust bearings 34, 36, positioned on either side of the branches 28.1, 28.2 of the clevis 28, to translationally immobilize the cylindrical pin 32 with respect to the branches 28.1, 28.2 in a direction parallel to the pivot axis A24.

According to this first embodiment, the cylindrical pin 32 has, at a first end, a head 38 which forms the first thrust bearing 34 and which is configured to bear against the exterior face F28.1 of the first branch 28.1 of the clevis 28.

The second thrust bearing 36 takes the form of a split pin 40 which passes through the cylindrical pin 32 and is configured to bear against the exterior face F28.2 of the second branch 28.2 of the clevis 28.

This first embodiment requires for both sides of the clevis 28 to be accessible so that the pivoting-connection device can be assembled, the cylindrical pin 32 being introduced from a first side of the clevis 28, the split pin being fitted from a second side of the clevis 28.

According to a second embodiment described in document FR-2.947.592 and illustrated in FIGS. 4 to 6, a pivoting-connection device comprises, in addition to the clevis 28 and to the arm 30, a connecting system comprising:

a tubular body 42 which, at a first end, has a flange 42.1 configured to bear against the exterior face F28.1 of the first branch 28.1 of the clevis 28 and, at a second end, at least one slot 42.2 allowing the second end of the tubular body 42 to expand radially, an insert 44 of frustoconical shape positioned inside the tubular body 42, at the second end thereof, having a tapped bore 44.1, and a screw 46, configured to become housed in the tubular body 42 and having, at a first end, a head 46.1 configured to be pressed firmly against the flange 42.1 of the tubular body 42 and, at a second end, a threaded portion 46.2 configured to screw into the tapped bore 44.1.

The screwing-in or unscrewing of the screw 46 causes the insert 44 and the head 46.1 of the screw 46 to move closer together or further apart. When the insert 44 and the head 46.1 of the screw 46 are in the apart state, the second end of the tubular body 42 is not radially expanded. When the insert 44 and the head 46.1 of the screw 46 are in the close-together state, the second end of the tubular body 42 is radially expanded.

According to this second embodiment, with the insert 44 and the head 46.1 of the screw 46 in the apart state, the connecting system is inserted into the bores of the branches 28.1, 28.2 of the clevis 28 and of the arm 30 from a first side of the clevis 28. When the connecting system is inserted, the head 46.1 of the screw 46 and the insert 44 are moved closer together by screwing the screw 46 in, from the first side of the clevis 28, so as to cause the second end of the tubular body 42 to expand.

Thus, according to this second embodiment, the flange 42.1 of the tubular body 42 forms a first thrust bearing allowing the tubular body 42 to be immobilized in a first sense of a direction. The expanding of the second end of the tubular body forms a second thrust bearing allowing the tubular body 42 to be immobilized in a second sense of the direction, which is the opposite sense to the first sense. Friction between the tubular body 42 and the second branch 28.2 of the clevis 28, as a result of the radial expansion of the second end of the tubular body, also contributes to immobilizing the tubular body 42 with respect to the second branch 28.2.

This second embodiment allows the pivoting-connection device to be assembled from just one side of the clevis 28.

However, this second embodiment gives rise to significant radial loadings on the bore of one of the two branches 28.2 of the clevis 28 because of the expanding of the second end of the tubular body 42.

The present invention seeks to overcome the disadvantages of the prior art.

SUMMARY OF THE INVENTION

To this end, one subject of the invention is a pivoting-connection device connecting at least two components and comprising:

a clevis, secured to the first component, having first and second branches each comprising an interior face facing towards the other branch and an exterior face on the opposite side to the interior face, as well as a bore which opens onto the interior and exterior faces, an arm, secured to the rest of the second component, positioned between the first and second branches of the clevis and comprising a bore, a cylindrical pin configured to become housed in the bores of the first and second branches and of the arm, forming a pivot axis, at least one guide ring, interposed between the first branch and the cylindrical pin, comprising a tubular body which has a flange configured to bear against the interior face of the first branch so as to block the guide ring with respect to the first branch in a direction parallel to the pivot axis, in a first sense of a direction.

In an embodiment according to the invention, the pivoting-connection device comprises:

an immobilizing system configured to occupy a free state in which the cylindrical pin and the guide ring slide relative to one another, in a direction parallel to the pivot axis, and a blocked state in which the cylindrical pin and the guide ring are immobilized with respect to one another in the longitudinal direction, in both senses of that direction, and a blocking system configured to occupy an unfitted state in which it allows the guide ring to slide in the bore of the first branch and a blocked state in which it is in contact with the exterior face of the first branch so as to block the guide ring with respect to the first branch in the longitudinal direction, in a second sense of that direction that is the opposite sense to the first sense.

Thus, the pivoting-connection device can be assembled from just one side of the clevis. According to another advantage, the pivoting-connection device does not introduce any radial load into the bore of one of the branches, unlike the second embodiment of the prior art. Finally, none of the other components of the pivoting-connection device is subjected to stress loadings in the blocked state.

According to another feature, the guide ring comprises a continuation projecting with respect to the exterior face of the first branch, the continuation having at least one slot that allows the continuation to expand radially in an elastic manner; the immobilizing system comprises at least one groove, which extends in a transverse plane on a peripheral face of the cylindrical pin, and at least one rib exhibiting shapes that complement those of the groove on an interior face of the continuation of the guide ring in contact with the peripheral face of the cylindrical pin when the continuation is not radially expanded.

According to one configuration, the groove and the rib have identical trapezoidal cross sections, and each have two flared lateral walls.

According to another feature, the blocking system comprises a screw thread at a portion of the tubular body of the guide ring, projecting with respect to the exterior face of the first branch and a blocking nut having a tapped bore configured to screw onto the screw thread, the blocking system being in the blocked state when the blocking nut, screwed onto the screw thread, is in contact with the exterior face of the first branch.

According to another feature, the pivoting-connection device comprises a locking system configured to prevent the immobilizing system from passing from the blocked state to the free state.

According to another configuration, the locking system comprises a locking ring, configured to push-fit onto the continuation and prevent the rib from leaving the groove.

According to another feature, the blocking nut and the locking ring are part of the one same component.

According to a first embodiment, the locking ring has an inside diameter greater than the outside diameter of the continuation and less than the outside diameter of the continuation increased by twice the height of the rib.

According to another embodiment, the locking ring has an internal surface that is slightly frustoconical so as to apply slight radial pressure to the continuation when the locking ring is pushed on.

Another subject of the invention is an aircraft comprising a cowl equipped with at least one pivoting-connection device according to one of the preceding features.

BRIEF DESCRIPTION OF THE DRAWINGS

Further features and advantages will become apparent from the description of the invention which will follow, which description is given solely by way of example with reference to the attached drawings in which:

FIG. 1 is a perspective view of an aircraft,

FIG. 2 is a perspective view of an aircraft engine assembly,

FIG. 3 is a perspective view of a pivoting-connection device illustrating a first embodiment of the prior art, in the unassembled state, FIG. 4 is a side view of a pivoting-connection device illustrating a second embodiment of the prior art, FIG. 5 is a longitudinal section through part of the pivoting-connection device visible in FIG. 4, FIG. 6 is a perspective view of part of the pivoting-connection device visible in FIG. 4, in the unassembled state, FIG. 7 is a longitudinal section through a pivoting-connection device illustrating one embodiment of the invention, FIG. 8 is a perspective view in cross section of part of the pivoting-connection device visible in FIG. 7, FIG. 9 is a lateral view of a guide ring and of a branch of a clevis of the pivoting-connection device visible in FIG. 7, in the unassembled state, FIG. 10 is a longitudinal section through the guide ring and the branch of the clevis visible in FIG. 9, in the assembled state, FIG. 11 is a perspective view in cross section of the guide ring visible in FIG. 9, FIGS. 12A and 12B are cross sections through part of a pivoting-connection device visible in FIG. 7 upon insertion of a cylindrical pin into the guide ring visible in FIGS. 9 to 11, and FIGS. 13A and 13B are cross sections through part of the pivoting-connection device visible in FIG. 7 upon fitting a blocking nut.

DETAILED DESCRIPTION OF THE PREFERRED EMBODIMENTS

FIG. 7 depicts a pivoting-connection device 50 that connects at least first and second components 52 and 54. In one application, the first component 52 is an aircraft nacelle cowl and the second component 54 is an aircraft nacelle.

The pivoting-connection device 50 comprises:

a clevis 56, secured to the first component 52, having first and second branches 58, 60, an arm 62, secured to the rest of the second component 54, positioned between the first and second branches 58, 60 of the clevis 56, a cylindrical pin 64, connecting the arm 62 and the clevis 56, forming a pivot axis A64.

For the remainder of the description, a longitudinal direction is a direction parallel to the pivot axis A64. A radial direction is perpendicular to the pivot axis A64. A longitudinal plane is a plane which passes through the pivot axis A64. A transverse plane is a plane perpendicular to the pivot axis A64.

According to one configuration, each branch 58 (or 60) comprises an interior face FI58 (or FI60), facing towards the other branch 60 (or 58), and an exterior face FE58 (or FE60) on the opposite side to the interior face FI58 (or FI60). The interior faces FI58, FI60 and the exterior faces FE58, FE60 are mutually parallel and positioned in transverse planes.

Each branch 58 (or 60) comprises a bore 66 (or 68) which opens onto the interior face FI58 (or FI60) and onto the exterior face FE58 (or FE60), the bore 66 (or 68) having an axis of revolution perpendicular to the interior face FI58 (or FI60) and to the exterior face FE58 (or FE60).

The arm 62 comprises two lateral faces F62, F62' which are mutually parallel and parallel to the pivot axis A64, and a bore 70 which opens onto the lateral faces F62, F62', the bore 70 having an axis of revolution perpendicular to the lateral faces F62, F62'.

The cylindrical pin 64 may be solid or hollow. It has a cylindrical peripheral face 72 coaxial with the pivot axis A64, which extends between first and second end faces 74.1, 74.2 substantially perpendicular to the pivot axis A64.

The pivoting-connection device 50 comprises at least one guide ring 76 interposed between one of the branches 58 and the cylindrical pin 64. The guide ring 76 comprises an inside diameter equal to the outside diameter of the cylindrical pin 64, and an outside diameter equal to the inside diameter of the bore 66 of the first branch 58.

In one configuration, the bores 66 to 70 of the first and second branches 58, 60 and of the arm 62 comprise guide rings. In one configuration, only the bores 66, 68 of the first and second branches 58, 60 comprise guide rings.

Whatever the configuration, the first branch 58 of the clevis 56 comprises a guide ring 76, positioned in the bore 66 of the first branch 58, which comprises:

a tubular body 78, extending between first and second ends 78.1, 78.2, which has:

a flange 80, at the first end 78.1, configured to bear against the interior face FI58 of the first branch 58, and a portion 82, at the second end 78.2, projecting with respect to the exterior face FE58 of the first branch 58 (when the guide ring 76 is positioned in the bore 66 of the first branch 58 and the flange 80 is also bearing against the interior face FI58 of the first branch 58), a continuation 84, extending between first and second ends 84.1, 84.2, projecting with respect to the exterior face FE58 of the first branch 58 (when the guide ring 76 is positioned in the bore 66 of the first branch 58 and also the flange 80 is bearing against the interior face FI58 of the first branch 58), the first end 84.1 of the continuation 84 being connected to the second end 78.2 of the tubular body 78, the continuation 84 having at least one slot 86 that allows the continuation 84 to expand radially in an elastic manner.

The tubular body 78 and the continuation 84 are part of the one same component.

According to one embodiment visible in FIGS. 9 to 11, the tubular body 78 and the continuation 84 have inside diameters that are identical and substantially equal to the outside diameter of the cylindrical pin 64. Thus, the continuation 84 comprises an interior face 85 in contact with the peripheral face of the cylindrical pin 64 when the continuation 84 is not radially expanded.

The tubular body 78 has an outside diameter substantially equal to the diameter of the bore 66 of the first branch 58 and greater than that of the continuation 84. The continuation 84 has a small thickness to encourage its elastic deformation.

The flange 80 has a diameter greater than the outside diameter of the tubular body 78. This flange 80 allows the guide ring 76 to be blocked with respect to the first branch 58 in the longitudinal direction, in a first sense of this direction.

According to one embodiment, the continuation 84 comprises several slots 86 spread evenly around the circumference of the continuation 84.

Each slot 86 is parallel to the pivot axis A64 and extends from the second end 84.2 of the continuation 84 approximately as far as the first end 84.1 of the continuation 84.

According to one feature of the invention, the pivoting-connection device comprises a system 88 for immobilizing the cylindrical pin 64 and the guide ring 76 relative to one another, configured to occupy a free state, visible in FIG. 12A, in which the cylindrical pin 64 and the guide ring 76 slide relative to one another in a direction parallel to the pivot axis A64, and a blocked state, visible in FIG. 12B, in which the cylindrical pin 64 and the guide ring 76 are immobilized with respect to one another in the longitudinal direction, in both senses of that direction.

According to one configuration, the immobilizing system 88 comprises shapes at the cylindrical pin 64 and at the continuation 84 of the guide ring 76 which are configured to engage with one another when the immobilizing system is in the blocked state.

According to one embodiment, immobilizing system 88 comprises at least one groove 90 which extends over the entire circumference of the peripheral face 72 of the cylindrical pin 64, in a transverse plane.

To complement that, the immobilizing system 88 comprises at least one rib 92, at the interior face 85 of the continuation 84 of the guide ring 76, the shapes of which complement those of the groove 90 of the cylindrical pin 64.

According to one configuration, the groove 90 and the rib 92 have identical trapezoidal cross sections and each have two flared lateral walls 94 (referenced in FIG. 12A) which make it easier for the rib 92 to enter or leave the groove 90.

The continuation 84 is configured to be able to deform radially in an elastic manner, notably by virtue of the slots 86, so as to allow the rib 92 to slide along the cylindrical pin 64 (as illustrated in FIG. 12A) when not positioned in line with the groove 90, and to enter the groove 90 (as illustrated in FIG. 12B) when the rib 92 and the groove 90 are positioned in alignment with one another.

The pivoting-connection device 50 comprises a blocking system 96 configured to occupy an unfitted state (visible in FIG. 13A), in which it allows the guide ring 76 to be fitted and to slide in the bore 66 of the first branch 58, and a blocked state (visible in FIG. 13B) in which it is in contact with the exterior face FE58 of the first branch 58 so as to block the guide ring 76 with respect to the first branch 58 in the longitudinal direction, in a second sense which is the opposite sense to the first sense. Thus, the blocking system 96 and the flange 80 immobilize the guide ring 76 with respect to the first branch 58 in the longitudinal direction, in both senses of that direction.

According to one embodiment, the blocking system 96 comprises a screw thread 98, at the portion 82 of the guide ring 76, projecting with respect to the exterior face FE58 of the first branch 58 and a blocking nut 100 having a tapped bore 102 configured to screw onto the screw thread 98. When the blocking nut 100, screwed onto the screw thread 98, is in contact with the exterior face FE58 of the first branch 58, the blocking system is in the blocked state. With the flange 80 in contact with the interior face FI58 of the first branch and the blocking nut 100 in contact with the exterior face FE58 of the first branch 58, the guide ring 76 is translationally immobilized with respect to the first branch 58 in the longitudinal direction, in both senses of that direction.

According to another feature of the invention, the pivoting-connection device 50 comprises a locking system 104 configured to prevent the immobilizing system 88 from passing through the blocked state into the free state by limiting the radial expansion of the continuation 84 of the guide ring 76.

According to one embodiment, the locking system 104 comprises a locking ring 106 configured to push fit onto the continuation 84 and prevent the rib 92 from leaving the groove 90.

According to one embodiment, this locking ring 106 has an inside diameter greater than or equal to the outside diameter of the continuation 84 and less than the outside diameter of the continuation 84 increased by twice the height (dimension measured in the radial direction) of the rib 92. According to one configuration, the locking ring 106 has an inside diameter substantially equal to the outside diameter of the continuation 84 so that there is no radial deformation in the blocked state.

According to another embodiment, the internal surface of the locking ring 106 has a shape that is slightly frustoconical so as to apply slight radial pressure to the external surface of the continuation 84 when the locking ring 106 is pushed on, this corresponding to the blocked state. Because of its flexibility, this pressure generates slight deformation of the continuation 84 in the direction of the cylindrical pin 64 and therefore radial pressure between the rib 92 and the groove 90, thereby generating tangential friction forces that prevent the relative rotation of the cylindrical pin 64 with respect to the continuation 84.

According to one embodiment visible in FIGS. 7, 8, 13A and 13B, the blocking nut 100 and the locking ring 106 form part of the one same component. Thus, screwing the blocking nut 100 on allows the locking ring 106 to be kept pushed onto the continuation 84.

According to one configuration, the pivoting-connection device 50 comprises a rotation-proofing system that prevents the blocking nut 100 from becoming unscrewed.

The assembling of the pivoting-connection device is described with reference to FIGS. 9, 10, 12A, 12B, 13A and 13B.

First of all, the guide ring 76 is introduced into the bore 66 of the first branch 58 from the interior face FI58, as illustrated in FIG. 9. The guide ring 76 slides in the bore 66 until the flange 80 comes into contact against the interior face FI58 of the first branch 58, as illustrated in FIG. 10.

Next, the cylindrical pin 64 is introduced, via the continuation 84, into the guide ring 76. The shape of the rib 92 encourages the radial expansion of the continuation 84 when the end face 74.1 of the cylindrical pin 64 comes into contact with the rib 92. The passage of the cylindrical pin 64 past the rib 92 causes the continuation 84 to expand radially in an elastic manner, as illustrated in FIG. 12A. The cylindrical pin 64 is introduced into the guide ring 76 until the rib 92 is engaged with the groove 90. Because of its elasticity, the continuation 84 reverts to its cylindrical shape, as illustrated in FIG. 12B. The immobilizing system 88 is in the blocked state. Thus, the cylindrical pin 64 and the guide ring 76 are immobilized with respect to one another in the longitudinal direction.

At this point, the blocking nut 100 and the locking ring 106 are pushed onto the continuation 84, as illustrated in FIG. 13A. The blocking nut 100 is screwed onto the threaded portion 82 of the guide ring 76 until it comes into contact with the exterior face FE58 of the first branch 58. The guide ring 76 is therefore immobilized with respect to the first branch 58 in a longitudinal direction, as illustrated in FIG. 13B. Because the cylindrical pin 64 is immobilized with respect to the guide ring 76 in the longitudinal direction, it finds itself again immobilized with respect to the first branch 58 in the longitudinal direction.

Because the locking ring 106 is connected to the blocking nut 100 when the latter is screwed on, it finds itself pushed onto the continuation 84 and prevents any radial expansion thereof.

According to the invention, the pivoting-connection device can be assembled from just one side of the clevis 56. Thus, the exterior face FE60 of the second branch 60 is able to be inaccessible.

In another advantage, the pivoting-connection device does not introduce any radial load into the bore of one of the branches, unlike in the second embodiment of the prior art. Finally, none of the other components of the pivoting-connection device is subjected to stress loadings in the blocked state.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pivoting-connection device connecting at least a first and a second component and comprising:
   a clevis, secured to the first component, having first and second branches each comprising an interior face facing towards the other branch and an exterior face on the side opposite to the interior face, and a bore which opens onto the interior and exterior faces,
   an arm, secured to a remainder of the second component, positioned between the first and second branches of the clevis and comprising a bore,
   a cylindrical pin configured to become housed in the bores of the first and second branches and of the arm, forming a pivot axis,
   at least one guide ring, interposed between the first branch and the cylindrical pin, comprising a tubular body which has a flange configured to bear against the interior face of the first branch so as to block the guide ring with respect to the first branch in a direction parallel to the pivot axis, in a first sense of a direction,
   wherein the pivoting-connection device comprises:

an immobilizing system configured to occupy a free state in which the cylindrical pin and the guide ring slide relative to one another, in a direction parallel to the pivot axis, and a blocked state in which the cylindrical pin and the guide ring are immobilized with respect to one another in the longitudinal direction, in both senses of that direction, a blocking system configured to occupy an unfitted state in which the blocking system allows the guide ring to slide in the bore of the first branch and a blocked state in which the blocking system is in contact with the exterior face of the first branch so as to block the guide ring with respect to the first branch in the longitudinal direction, in a second sense of that direction that is an opposite sense to the first sense, and wherein the guide ring comprises a continuation projecting with respect to the exterior face of the first branch, the continuation having at least one slot that allows the continuation to expand radially in an elastic manner, and wherein the immobilizing system comprises at least one groove, which extends in a transverse plane on a peripheral face of the cylindrical pin, and at least one rib exhibiting shapes that complement those of the groove on an interior face of the continuation of the guide ring in contact with the peripheral face of the cylindrical pin when the continuation is not radially expanded.

2. The pivoting-connection device according to claim 1, wherein the at least one groove and rib have identical trapezoidal cross sections and each have two flared lateral walls.

3. The pivoting-connection device according to claim 1, wherein the blocking system comprises a screw thread at a portion of the tubular body of the guide ring, projecting with respect to the exterior face of the first branch and a blocking nut having a tapped bore configured to screw onto the screw thread, the blocking system being in the blocked state when the blocking nut, screwed onto the screw thread, is in contact with the exterior face of the first branch.

4. The pivoting-connection device according to claim 3, wherein the pivoting-connection device comprises a locking system configured to prevent the immobilizing system from passing from the blocked state to the free state.

5. The pivoting-connection device according to claim 4, wherein the locking system comprises a locking ring, configured to push-fit onto the continuation and prevent the at least one rib from leaving the at least one groove.

6. The pivoting-connection device according to claim 5, wherein the blocking nut and the locking ring are part of the one same component.

7. The pivoting-connection device according to claim 5, wherein the locking ring has an inside diameter greater than an outside diameter of the continuation and less than an outside diameter of the continuation increased by twice a height of the at least one rib.

8. The pivoting-connection device according to claim 5, wherein the locking ring has an internal surface that is slightly frustoconical so as to apply slight radial pressure to the continuation when the locking ring is pushed on.

9. An aircraft comprising a cowl equipped with at least one pivoting-connection device according to claim 1.

* * * * *